March 23, 1943. B. E. ROETHELI ET AL 2,314,457
PRODUCING DIMERS OF OLEFINS
Filed Jan. 26, 1937
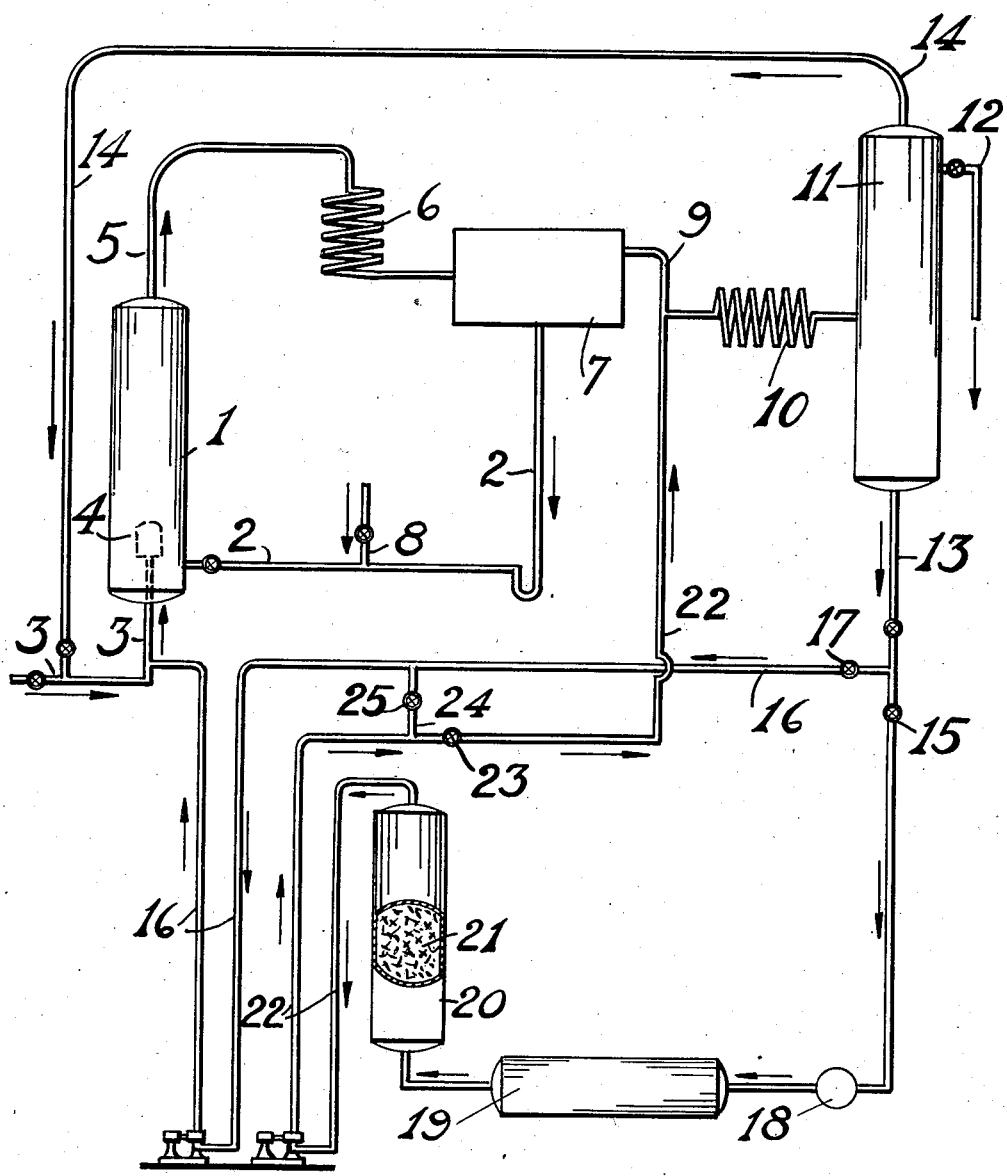

Patented Mar. 23, 1943

2,314,457

UNITED STATES PATENT OFFICE 2,314,457

PRODUCING DIMERS OF OLEFINS

Bruno E. Roetheli and Mervin E. Conn, Baton Rouge, La., assignors to Standard Oil Development Company, a corporation of Delaware Application January 26, 1937, Serial No. 122,351

10 Claims. (Cl. 260—683.1)

The present invention relates to the polymerization of olefins. It is particularly directed to the co-polymerization of normal and iso-butylene to isomers of octylene. Co-polymerization of normal and iso-butylene is usually conducted by contacting the mixed olefins with sulfuric acid of a strength ranging from 60% to 75% at a temperature between 150° F. and 300° F., preferably between 200° and 225° F. It is preferred to conduct the operation under sufficient pressure to maintain the $C_4$ hydrocarbons in the liquid phase. In general, the pressure will range between 200 lbs./sq. in. and 600 lbs./sq. in. If desired, the operation can be conducted in a plurality of stages, the first steps being the adsorption of the olefins by acid of suitable strength and at a suitable temperature, followed by a joinder of the extracts so obtained, and heating of the mixture to a temperature within the range indicated above.

The polymerization of isobutylene itself may be effected under somewhat similar conditions, the temperature generally being between 175° F. and 210° F. This operation is also preferably conducted in the liquid phase.

In polymerization processes of the type referred to above, substantial amounts of trimers are formed. While these trimers may be used for a great many purposes, and may be readily converted into dimer and monomer by thermal decomposition, it is desirable to minimize, as much as possible, their formation during the polymerization reaction. We have now found that this object can be attained in a large measure by introducing trimer with the feed to the polymerization chamber.

In an actual operation according to this invention, the product from the polymerization chamber is fractionated into three cuts, the first being unreacted initial material which may be recycled, the second being dimer which is withdrawn as a side stream from the fractionating zone, and the third being trimer which is recovered as bottoms from the fractionating zone, and a predetermined amount of trimer is recycled to the feed stock to the polymerization zone. The amount of trimer recycled to the feed stock or introduced into the feed stock from an extraneous source may vary within fairly wide limits. To effect a marked decrease in the ratio of trimer to dimer in the polymerization product, the trimer should constitute at least 1% by volume of the feed. It is advisable not to employ an amount of added trimer exceeding 10% of the feed. Preferably, the trimer should constitute from 2 to 5% by volume of the feed.

In the preferred embodiment of the present invention, that portion of the trimer which is not recycled as such to the polymerization zone is conducted thru a reaction zone in which it is thermally decomposed to isobutylene which is added to the feed to the polymerization unit. This thermal conversion may be accomplished by heat alone at temperatures of the order of 450 to 500° F. It is preferred, however, to employ catalysts, such as Florida earth, activated clay, for example, of the type known as marcil, and the like. With such catalysts, temperatures of the order of 400° F. to 450° F. are employed. These catalysts appear to selectively direct the cracking of the trimer to isobutylene with practically no formation of carbon, methane, hydrogen or hydrocarbons having fewer carbon atoms than isobutylene.

In the accompanying drawing, a front elevation of a plant suitable for carrying out the process of the present invention is illustrated diagrammatically. Referring specifically to the drawing, 1 is a polymerization chamber partly filled with sulfuric acid and provided with an acid inlet 2, a hydrocarbon inlet 3, provided with a porous thimble 4, and a product outlet 5. The reaction mixture in this chamber may be heated in any conventional manner, such as by a steam coil.

The product leaving reaction chamber 1 thru line 5 passes thru a cooling coil 6 into a separator 7 in which the acid separates from the polymer and unconverted feed stock. The acid leaves separator 7 thru line 2 by which it is recycled to the polymerization zone. Suitable equipment may be arranged in line 2 for the regeneration of acid by the decomposition of alkyl sulfates contained therein and for the adjustment of the concentration of the acid. Line 2 is provided with a branch line 8 for the introduction of fresh acid into the system.

The polymer and unconverted feed stock leaves separator 7 thru line 9 and passes thru heating coil 10 into fractionating tower 11 which is provided with the customary fractionating equipment, such as discs and doughnuts or bell cap plates. This tower is provided with a draw-off line 12 for the withdrawal of dimer cut and a bottom draw-off line 13 for the withdrawal of trimer and any heavier polymer which may be present. Unconverted $C_4$ hydrocarbons leave the tower thru line 14, which may be provided with condensing equipment for the liquefaction of the $C_4$ hydrocarbons, part of which may be reintroduced into the top of tower 7 as reflux condensate, the remainder being joined with the feed to the polymerization zone in line 3, or removed from the system or fed to a catalytic dehydrogenation or thermal polymerization chamber.

Line 13 is provided with a valve 15 and with a branch line 16 connected to line 3 and controlled by valve 17. By suitable manipulation of valves 15 and 17 any desired amount of trimer may be recycled to the feed stock. The remainder passes thru line 13, thru pressure reduction valve 18, and thru furnace 19 into cracking chamber 20 provided with a catalyst 21 of the type referred to above. The cracked product, if it contains any considerable portion of dimer, is conducted thru line 22 from cracking chamber 20 to line 9. When this is done, it is usually possible to dispense with heating coil 10, since the necessary heat for the fractionation of the reaction product from the polymerization zone will be contained in the cracked product from the cracking zone. Line 22 is provided with a valve 23 and a branch line 24 controlled by valve 25. By suitable manipulation of valves 23 and 25, all or part of the product from cracking chamber 20 may be added directly to the feed to the polymerization zone.

The effect of the recycling or addition of trimer to the feed to a polymerization unit of the character referred to above was determined by making two runs identical with regard to concentration of acid and operating conditions, no trimer being added in one run and 3.8% by volume of the feed of trimer being added in the second run. 60% acid was employed and the temperature was 225° F. In the first run the ratio of dimer to trimer in the product was 78 to 22. In the second run this ratio was 86 to 14.

The present invention is not restricted to any particular type of polymerization. It is to be understood, however, that it is not applicable to the polymerization of isobutylene at sub-zero temperatures by the action of boron fluoride for the production of polymers of extremely high molecular weight. In such a polymerization it is important that no low-molecular-weight polymer be present in the feed stock. In general, therefore, the present invention may be said to be applicable to the production of dimers by polymerization or co-polymerization of olefins either catalytically by the action of sulfuric or phosphoric acid, or a similar catalyst.

In the appended claims the expression "monomeric olefin" is employed to designate both normal and iso-olefins. The word "dimer" is intended to cover a polymer of any single normal or iso-olefin, or co-polymer of any mixture of normal and iso-olefins. Likewise, the word "trimer" is employed to designate a polymer of any single iso- or normal olefin, or a co-polymer of any mixture of normal and iso-olefins.

The nature and objects of the present invention having been thus described and illustrated, what is claimed as new and useful and desired to be secured by Letters Patent is:

1. In the production of a dimer by the polymerization of a normally gaseous monomeric olefin, the step of adding a trimer of said olefin to the feed stock to the polymerization unit in an amount between about 1% and about 10% by volume of the feed stock.

2. In the production of an octylene by the polymerization of a butylene, the step of adding a trimer of the butylene to the feed stock to the polymerization unit in an amount between about 1% and about 10% by volume of the feed stock.

3. A process for the co-polymerization of iso- and normal butylenes to iso-octylenes, which comprises contacting a mixture of iso- and normal butylenes with sulfuric acid of a strength ranging from 60% to 75% at a temperature between 150° F. and 300° F., separating a product containing unconverted butylenes, co-dimer, and trimer from the sulfuric acid, subjecting said product to fractionation whereby it is separated into its components and recycling a trimer to the feed to the sulfuric acid in an amount between about 1% and about 10% by volume of the feed stock.

4. A process according to claim 3 in which the amount of trimer recycled constitutes between about 2 and about 5% by volume of the feed stock.

5. A process for the co-polymerization of iso- and normal butylenes to iso-octylenes which comprises contacting a mixture of iso- and normal butylenes with sulfuric acid of a strength ranging from 60% to 75% at a temperature between 150° F. and 300° F., separating a product containing unconverted butylenes, co-dimer and trimer from the sulfuric acid, subjecting said product to fractionation whereby it is separated into its components, recycling between about 1% and about 10% by volume of the trimer to the feed to the sulfuric acid, subjecting the remainder of said trimer to the action of an active clay at a temperature of at least 400° F. whereby it is converted into monomeric and dimeric butylenes, subjecting the product of this cracking operation to fractionation together with the product from the polymerization stage, and recycling the unconverted butylenes recovered by said fractionation to the feed to the sulfuric acid.

6. The method of producing dimer by the polymerization of normally gaseous monomeric olefins wherein substantial amounts of trimers are formed, which comprises passing said olefins, together with sufficient trimer to suppress the formation of said trimer in the polymerization reaction, thru a polymerizing zone containing a polymerizing catalyst, maintaining said polymerizing zone under conditions favoring the formation of dimer and separating the resulting polymer product into a dimer fraction and a higher boiling fraction.

7. A process as in claim 6 wherein the reaction is carried out continuously and wherein at least a portion of the trimer contained in said higher boiling fraction is returned continuously to said polymerization zone.

8. The method of producing diisobutylene by the polymerization of monomeric isobutylene wherein substantial amounts of triisobutylene are formed which comprises passing said isobutylene, together with sufficient triisobutylene to suppress the formation of said triisobutylene in the polymerization reaction, thru a polymerizing zone containing a polymerizing catalyst, maintaining said polymerizing zone under conditions favoring the formation of diisobutylene, separating the resulting polymer products into a diisobutylene fraction and a higher boiling fraction.

9. A process as in claim 8 wherein at least a portion of the triisobutylene contained in said higher boiling fraction is returned to said polymerization zone.

10. A process as in claim 8 wherein the reactions are carried out continuously and wherein triisobutylene is continuously introduced into the polymerization zone, said triisobutylene having been obtained from the higher boiling fraction formed during the process.

BRUNO E. ROETHELI.
MERVIN E. CONN.